United States Patent
Roslund et al.

(10) Patent No.: US 12,455,796 B2
(45) Date of Patent: Oct. 28, 2025

(54) METHOD FOR AUTOMATIC RECOVERY USING MICROSHARD DATA FRAGMENTATION

(71) Applicant: Shardsecure, Inc., New York, NY (US)

(72) Inventors: Christer Roslund, Tyreso (SE); Jesper Tohmo, Varmdo (SE); Anthony Whitehead, Njurunda (SE); Zachary Link, Atlanta (GA)

(73) Assignee: ShardSecure, Inc., New York, NY (US)

( * ) Notice: Subject to any disclaimer, the term of this patent is extended or adjusted under 35 U.S.C. 154(b) by 0 days.

(21) Appl. No.: 18/719,353

(22) PCT Filed: Nov. 30, 2022

(86) PCT No.: PCT/US2022/051310
§ 371 (c)(1),
(2) Date: Jun. 13, 2024

(87) PCT Pub. No.: WO2023/114003
PCT Pub. Date: Jun. 22, 2023

(65) Prior Publication Data
US 2025/0061029 A1    Feb. 20, 2025

Related U.S. Application Data

(60) Provisional application No. 63/394,046, filed on Aug. 1, 2022, provisional application No. 63/290,950, filed on Dec. 17, 2021.

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
CPC .. G06F 11/1469; G06F 11/14; G06F 2201/84; G06F 11/1666; G06F 11/2053; G06F 11/08
See application file for complete search history.

(56) References Cited

U.S. PATENT DOCUMENTS

| | | |
|---|---|---|
| 8,954,406 B2 | 2/2015 | Rodriguez et al. |
| 2005/0022057 A1* | 1/2005 | Takamoto ........... G06F 11/2094 714/E11.085 |

(Continued)

FOREIGN PATENT DOCUMENTS

| | | |
|---|---|---|
| GB | 2444344 A | 4/2008 |
| WO | 2019032556 A1 | 2/2019 |

OTHER PUBLICATIONS

SENS Piere et al. "Performance Evaluation of Fault Tolerance for Parallel Applications in Networked Environments", Proceedings of the 1997 International Conference on Parallel Processing, pp. 334-341. IEEE, Los Angeles, CA. Aug. 11, 1997.

*Primary Examiner* — Kamini B Patel
(74) *Attorney, Agent, or Firm* — David Todd Shoneman; Michael A. Pugel

(57) ABSTRACT

A system and method for automatic recovery of a portion of source data, broken into a plurality of microshard data fragments, is described. The system and method include storing one data fragment in a first storage element of a first storage resource having a plurality of storage elements, creating and storing a duplicate of the one data fragment in a first storage element of a second storage resource having at least the same number of storage elements as the first storage resource, determining whether an error has occurred in the first storage element of the first storage resource, and creating and storing a duplicate of the data fragment from the first storage element of the second storage resource in a first recovery storage resource based on the determination.

(Continued)

The duplicate of the data fragment from the first recovery storage resource is used to recover the portion of the source data.

20 Claims, 13 Drawing Sheets

(56) References Cited

U.S. PATENT DOCUMENTS

| | | | |
|---|---|---|---|
| 2006/0047712 A1* | 3/2006 | Shitomi | G06F 11/201 |
| 2008/0201336 A1 | 8/2008 | Yamato | |
| 2010/0241629 A1* | 9/2010 | Tatemura | G06F 16/25 |
| | | | 707/769 |
| 2013/0110767 A1* | 5/2013 | Tatemura | G06F 16/221 |
| | | | 707/E17.001 |
| 2014/0250320 A1* | 9/2014 | Nyuunoya | G06F 11/2028 |
| | | | 714/4.11 |
| 2014/0337296 A1* | 11/2014 | Knight | G06F 11/1448 |
| | | | 707/674 |
| 2016/0019745 A1* | 1/2016 | Graham | A63F 13/71 |
| | | | 463/31 |
| 2016/0154698 A1* | 6/2016 | Kazi | G06F 11/1092 |
| | | | 714/766 |
| 2019/0163391 A1* | 5/2019 | Annamalai | G06F 3/0611 |
| 2020/0042390 A1* | 2/2020 | Roberts | G06F 11/1092 |
| 2020/0143074 A1* | 5/2020 | Steinberg | G06F 21/6209 |

* cited by examiner

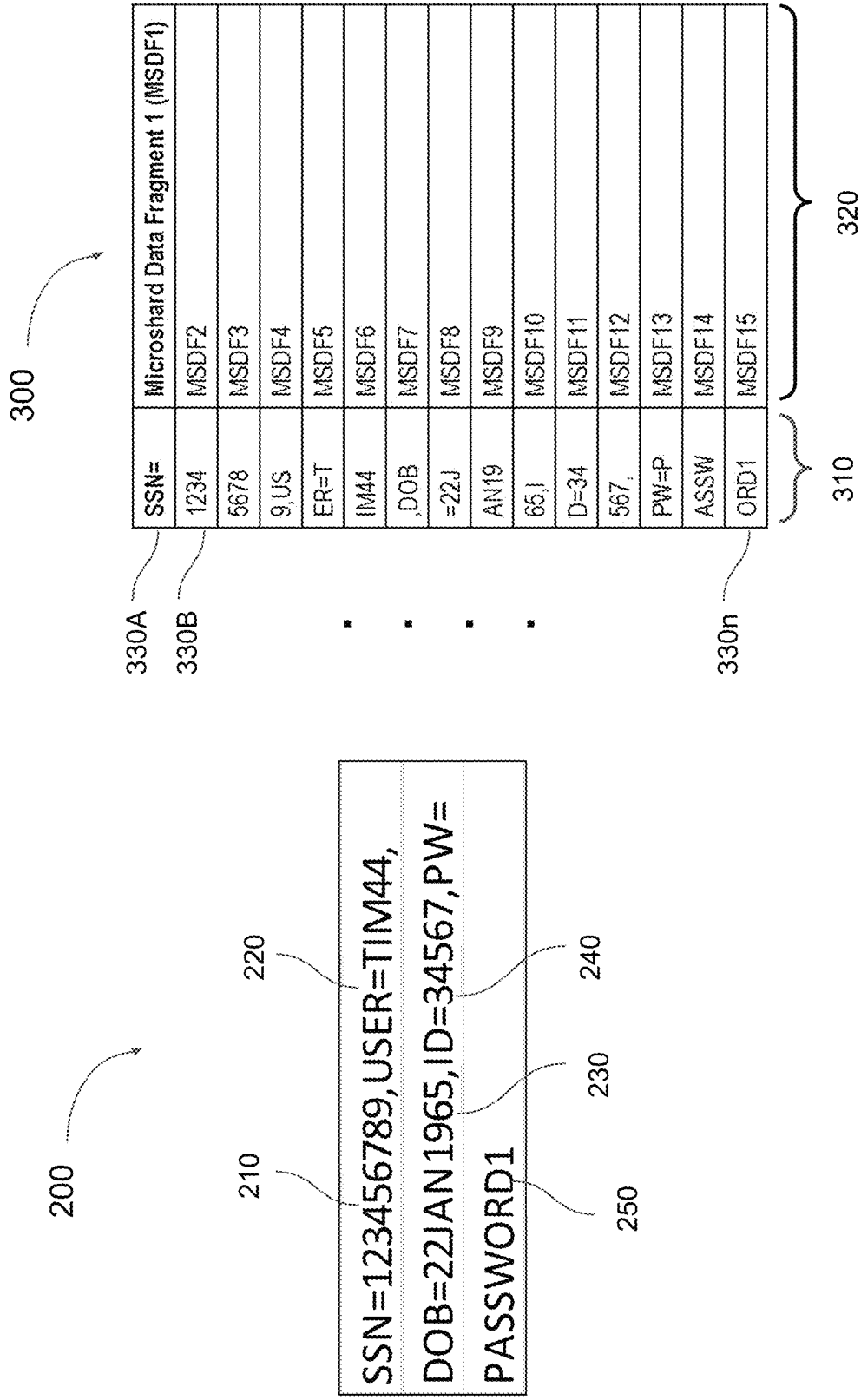

METHOD FOR AUTOMATIC RECOVERY USING MICROSHARD DATA FRAGMENTATION

TECHNICAL FIELD

The present disclosure generally relates to automatic recovery of data that has been comprised in a system that leverages the creation, storage and recovery of microshard data fragments and more specifically to mechanisms for error recovery of the microshard data fragments.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

Currently, data protection is achieved using one of several methodologies and structures. For example, data can be made less accessible by placing it on a protected server behind a firewall. Data can be made less understandable, by obfuscating it through methods like encryption. Lastly, data can be made less valuable by replacing portions of the data with placeholders through a method called "tokenization". Each of these methods has limitations, particularly when used in isolation. Firewalls can be breached, or an "inside threat" can effectively bypass access controls. Token repositories are high-value targets that can be hacked or otherwise compromised.

The most common method for data security, both at rest and in motion (i.e., as it traverses a network or components of a computer system), involves obfuscation through encryption whereby data is scrambled using a "key". Methods to decrypt this data, once acquired by an actor without the key, vary based on the complexity of the algorithm used. In all cases, it is presumed that the actor has the full set of encrypted data, making access to a decrypted copy a function of time and the amount of computational capability employed. The ease of decryption increases with the increase in a computer's processing speed. There is generally no expectation that computer speed will do anything but continue to increase thereby merely slowing down but not preventing the attacker from accessing the data.

More recently, data fragmentation has emerged as a technique to either obscure data though continuous relocation, or through allowing multiple encryption algorithms to be used within a file. New techniques can now focus on obscuring the data by creating microshard data fragments or microshard data that are smaller than the valuable data that is to be protected. Further, intentionally disordering them will frustrate attempts to find and reassemble the data.

The storage process and resources for the microshard data can be used to create an additional barrier to unauthorized access by storing the microshard data in a vast array of storage devices that span a wide geographical area as well as a wide network logical area. However, such a storage process will often be managed ad hoc and can be very complicated. The ad hoc and complicated nature of the process may lead to data access being slow and/or unavailable due to communication failure. Further, errors may occur in the process that can lead to unintentional data deletion, corruption of data, and unexpected or unrecoverable storage hardware failure. Systems to better manage storage processes and allow recovery from errors are available, such as storage redundancy mechanisms and added error correction schemes in the data. However, these mechanisms often have limitations with respect to large scale geographically expansive storage processes such as can be used with microshard data. Therefore, there is a need for an improved mechanism for automatic recovery of data, such as microshard data, from a storage system that has incurred errors.

SUMMARY

According to one implementation, a method for automatic recovery of a portion of source data that is broken into a plurality of microshard data fragments is described. The method includes storing one of the plurality of microshard data fragments in a first storage element of a first storage resource, the first storage resource having a plurality of storage elements and creating and storing a duplicate of the one of the plurality of microshard data fragments in a first storage element of a second storage resource, the second storage resource having at least the same number of storage elements as the first storage resource. The method further includes determining whether an error has occurred in the first storage element of the first storage resource and creating and storing a duplicate of the microshard data fragment stored in the first storage element of the second storage resource in a first recovery storage resource based on the determination. The duplicate of the microshard data fragment stored in the first recovery storage resource is used to recover the portion of the source data.

According to another implementation, a system for automatic recovery of a portion of source data that is broken into a plurality of microshard data fragments is described. The system includes a microshard data fragment engine generating a plurality of microshard data fragments from the portion of the source data, a first storage resource containing a plurality of storage elements, and a second storage resource containing the same number of storage elements as the first storage resource. The system also includes a storage resource manager, coupled to the microshard data fragment engine, the first storage resource and the second storage resource. The storage resource manager stores one of the plurality of microshard data fragments in a first storage element of the first storage resource and creates and stores a duplicate of the one of the plurality of microshard data fragments in a first storage element of the second storage resource. The storage resource manager further determines whether an error has occurred in the first storage element of the first storage resource. The system additionally includes a first recovery storage resource coupled to the storage resource manager. The storage resource manager further creates and stores a duplicate of the microshard data fragment stored in the first storage element of the second storage resource in a first recovery storage resource based on the determination. The duplicate of the microshard data fragment stored in the first recovery storage resource is used to recover the portion of the source data.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable:

FIG. 2 is a table illustrating entries in an exemplary data file, according to aspects of the present disclosure;

FIG. 3 is a table illustrating an exemplary microshard data fragment list for the exemplary data file in FIG. 2, according to aspects of the present disclosure;

DETAILED DESCRIPTION

Figure 1:
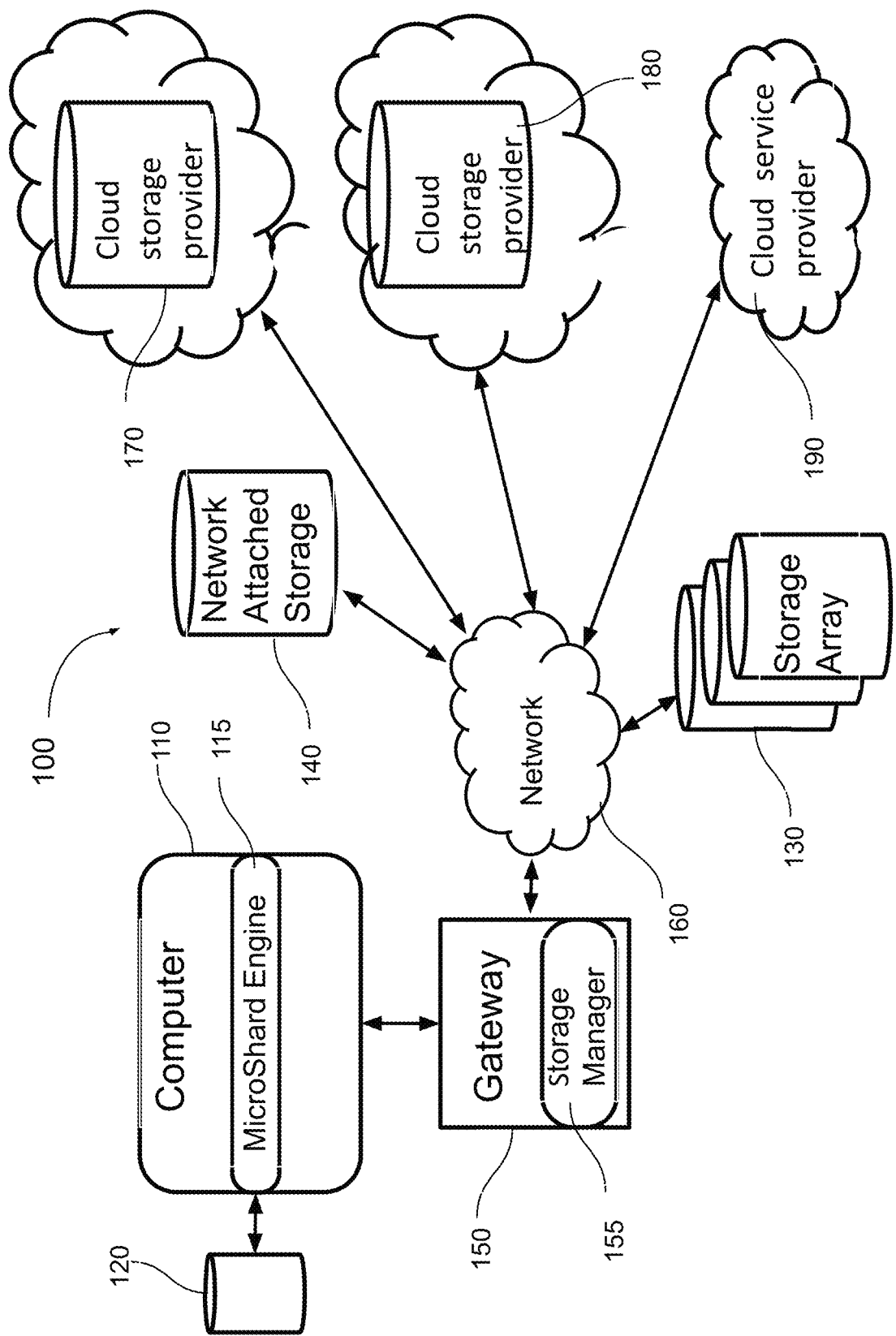
FIG. 1 is a block diagram of an exemplary system, according to aspects of the present disclosure.

It should be understood that the components shown in the figures may be implemented in various forms of hardware, software, or combinations on one or more appropriately programmed general-purpose devices, which may include a processor, memory, and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various components shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a system on a chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), an SOC, and/or a state machine. As used herein, the terms "transaction" and "electronic transaction" broadly refer to any transaction which may be electronically validated by the recited system, method, and apparatus.

One or more of the aspects of the embodiments described above may be implemented using application-specific hardware. Further, one or more aspects of the embodiments may be implemented using one or more processing components, such as central processing units (CPUs) that may include specific operating instructions embedded as firmware in the processing component(s) or may operate from software code that is downloaded into the storage elements from one or more memory units coupled to the processing components(s).

The present disclosure addresses issues related to recovering a source file that has been broken into smaller portions of data, such as microshard data, from a set of storage structures or storage devices in which at least an error has occurred with one or more portions or storage elements of the storage structure or device. These errors may include, but are not limited to, corruption of the data itself, unintentional erasure of data, and operational failure of one or more storage elements in the structure or device. The present disclosure addresses these issues by creating a storage management mechanism that can address many of the specific errors that can occur as part of a uniform storage resource configuration for the data. The mechanism balances the use of storage redundancy with the use of known data error correction techniques to create a mechanism that is resilient against even a failure of a significant portion of a structure or device.

Accordingly, the present disclosure creates a method and system for automatic recovery of data, such as microshard data, in a storage system that utilizes a storage resource manager that can configure and control the storage and recovery of the data over a wide range of storage structures or devices, which may not be geographically or even architecturally integrated into one structure or device. The storage resource manager configures the storage space used for storing the data into three sets of resources. A first resource serves as the primary storage for the data. A second resource serves as a backup or secondary storage and is configured identically to the first resource. The second resource is linked to the first resource. A third resource serves as a recovery mechanism for the first resource as well as, in some situations, the second resource and is used as part of certain error recovery modes. The storage resource manager provides instruction or modifies where data is stored, how it is linked in the resources and how it will be recovered in response to the detection of different errors in the storage resources.

Advantages of the present disclosure will become more apparent from the detailed description given hereinafter. However, it should be understood that the detailed description and specific examples, while indicating preferred embodiments of the present disclosure, are given by way of illustration only, since various changes and modifications within the scope of the present disclosure will become apparent to those skilled in the art from this detailed description.

FIG. 1 illustrates a block diagram of an exemplary system 100, according to aspects of the present disclosure. System 100 includes a computer 110. Computer 110 is coupled to memory 120. Computer 110 is also coupled to gateway 150. Gateway 150 is further coupled to storage array 130, network attached storage 140, cloud storage provider 170, cloud storage provider 180, and cloud service provider 190 through network 160.

Computer 110 includes various components for interfacing to networks, processing data, and communicating with a user or operator through various user interface components.

Computer 110 may also include various forms of local memory including, but not limited to, ROM, RAM, non-volatile memory, and the like. Computer 110 receives data from a local data source or from network 160 through a network interface component. The data may be data that is to be processed by computer 110. Computer 110 may also be configured to operate in conjunction with other computers (not shown) to process microshard data fragments as well as other data and information. For example, the data may be provided to microshard engine 115 for processing. The microshard engine 115 may split the received data, or source data into a plurality of microshard data fragments, each microshard data fragment containing only a portion of any one data element of the source data. The microshard engine 115 may also be configured to reassemble microshard data fragments back into the original source data when requested for use through computer 110. Examples of devices that can be used for computer 110 include, but are not limited to, a desktop computer, a laptop computer, a tablet, a mobile phone, a computer server, and the like. Memory 120 stores instructions and control software used by computer 110 as part of processing data, such as microshard data fragments. Memory 120 may also store received data for later processing and also store processed data as needed and/or prior to delivery to other devices through network 160. Examples of devices that may be used for memory 120 include, but are not limited to, a magnetic disk drive, an optical disk drive, a portable flash drive, a solid state drive, and the like.

The microshard data fragments are provided by computer 110 to gateway 150. Gateway 150 provides a network interface to communicate with devices located geographically closer in proximity, such as storage array 130 and network attached storage 140, or located a great distance from either computer 110 or gateway 150, such as cloud storage provider 170, cloud storage provider 180, and cloud service provider 190. Gateway 150 may provide microshard data fragments generated by computer 110 to any or all of storage array 130, network attached storage 140, and cloud storage providers 170 and 180 for storage or to cloud service provider 190 for further processing. In order to facilitate and manage delivery and storage of the microshard data fragments, gateway 150 includes a storage manager 155. Storage manager 155 identifies the microshard data fragments, generates routing information for network 160, and manages the destination information to track any of the microshard data fragments that are stored in the described storage devices or structures. For example, storage manager 155 may create and manage a set of pointers to each of the microshard data fragments and use the pointers to identify memory locations or storage elements in each of the storage devices or structures where the microshard data fragments are stored. The storage manager 155 may retrieve microshard data fragments from the memory locations or storage elements in any of storage array 130, network attached storage 140, cloud storage provider 170, and cloud storage provider 180 and provide the microshard data fragments to computer 110 over network 160 for reassembly into source data as described above. Examples of devices that may be used as gateway 150 include, but are not limited to, a server hub, a modem, a desktop computer, a laptop computer, and the like. Further information about the generation of microshard data fragments and pointers from a source file, along with the reassembly of the source from the microshard data fragments is described in US20200143074A1.

The storage array 130 and network attached storage 140 provide large and long term storage capabilities that may be close in proximity to computer 110 or within a small or confined portion of network 160. For example, one or both of storage array 130 and network attached storage 140 may be connected through a local area network (LAN), such as an ethernet network or a wireless network configured to use the Institute of Electrical and Electronics Engineers (IEEE) standard 802.11. One or both of the storage array 130 and network attached storage 140 may be referred to as storage structures and may utilize any combination of magnetic hard disk drives, optical disk drives or solid state drives.

Cloud storage provider 170 and cloud storage provider 180 are commercial memory service operators that provide storage of data in the cloud, at various locations geographically separated from each other and from computer 110 and/or gateway 150. The physical storage structures used by cloud storage providers 170 and 180 may be similar to that described above for storage array 130 and network attached storage 140. In order to operate with storage manager 155, a portion of the storage structures used by storage array 130, network attached storage 140, and cloud storage providers 170 and 180 may be configured into a set of storage resources, identified as a first or primary storage resource, a second or secondary resource, and third or recovery storage resource. Each storage resource contains a set of storage elements used to store microshard data fragments. In an embodiment, each storage element can store a single microshard fragment. In other embodiments, some or all of the storage elements may be able to store a plurality of microshard data fragments.

It is worth noting that computer 110 may also be configured to include some of all of the operations of storage manager 155 in order to operate cooperatively with, or in place of the storage manager 155 in gateway 150. Further, gateway 150 may also be configured to include some of all of the operations of microshard engine 115 in order to operate cooperatively with, or in place of the microshard engine 115 in computer 110 Additionally, in some embodiments, gateway 150 and computer 110 may be combined into a single processing device. It is also worth noting that the use of a plurality of memory storage devices at various locations may limit the ability of an attacker to eavesdrop on a network segment and capture microshard data fragments as they are written or read.

In operation, system 100 is configured to automatically recover microshard data fragments in one or more storage resources at storage providers, such as storage array 130, networked attached storage 140, cloud storage provider 170 and cloud storage provider 180. Storage manager 115 in gateway 150 generates a pointer for a microshard data fragment containing a small portion of source data received at computer 110. Gateway 150 delivers the microshard data fragment to cloud storage provider 170 for storage in a first storage element of a first storage resource. Storage manager 115 generates a duplicate of the microshard data fragment and gateway 150 delivers the duplicate to the storage provider for storage in a first storage element of a second storage resource. Storage manager 115 monitors the status of the first and second storage resources at the storage provider. If storage manager 115 determines that an error has occurred in, for instance, the first storage element of the first storage resource, storage manager 115 may retrieve the microshard data fragment for the first storage element of the second storage resource, generate a duplicate and deliver the duplicate to the storage provider for storage in a first recovery resource. Alternatively, storage manager 115 may provide a message to the storage provider to generate the duplicate of the microshard data fragment from the first storage element of the second resource and store the duplicate in the first recovery resource. Information associated with automatic recovery of microshard data fragments will be described in further detail below.

FIG. 2 is a table illustrating entries in an exemplary data file 200 according to aspects of the present disclosure. The entries in the data file 200 may be received at a computer, such as computer 110 as part of system 100 described in FIG. 1. The entries in data file 200 include user account information in a plurality of comma delimited fields. The fields include social security number (SSN) 210, username (USER) 220, date of birth (DOB) 230, user identification number (ID) 240 and password (PW) 250. The data for each field is shown after the equals sign (=). The entries are shown as characters that are coded into separate bytes of digital data using a protocol, such as the American Standard Code for Information Interchange (ASCII) protocol. It is worth noting that other arrangements of entries may be possible, and the entries include different information.

FIG. 3 is a table illustrating an exemplary microshard fragment data list 300 for the exemplary data file 200 in FIG. 2 according to aspects of the present disclosure. The microshard fragment data list 300 is arranged as a set of rows 330A-330n that include a first column 310 and a second column 320. The first column 310 contains the microshard data fragments that have been generated from the entries in the data 200. The second column 320 contains an identifier for each of the generated microshard data fragments. As shown, entries from data file 200 have been split into four-character data fragments. For example, the first microshard fragment in row 330A contains "SSN=" in column 310 and has an identifier "MSDF1" in column 320. The second microshard fragment in row 330B contains "1234" in column 310 and has an identifier "MSDF2" in column 320. The last microshard fragment in row 330n contains "ORD1" in column 310 and has an identifier "MSDF15" in column 320. Each microshard data fragment shown in the microshard data list 300 is generated using a microshard data engine, such as microshard data engine 115 included in system 100 described in FIG. 1. Additionally, identifiers for each of the microshard data fragments may be generated in the microshard engine, in some other portion of the device including the microshard engine (e.g., computer 110), or in some other device in the system (e.g., gateway 150).

The size of the microshard data fragment may be determined by the computer (e.g., computer 110 in FIG. 1), the user or data owner based on the parameters and characteristics of the data in data file 200. It is worth noting that a level of security of the data is established when no microshard data fragment contains sufficient data to be of value to anyone who receives it. In microshard fragment data list 300, the microshard data fragment size is 4 characters based on at least 5 characters (e.g, 5 bytes) of data being needed to represent the smallest size entry in data list 200. Other embodiments may include different sizes for the microshard data fragments and/or have the size of the microshard data fragments determined by other criteria. For instance, the maximum microshard data fragment size could also be set so that the probability of having many valuable data elements and contextual information contained in microshard data fragments is sufficiently reduced to meet a given risk tolerance.

Figure 4:
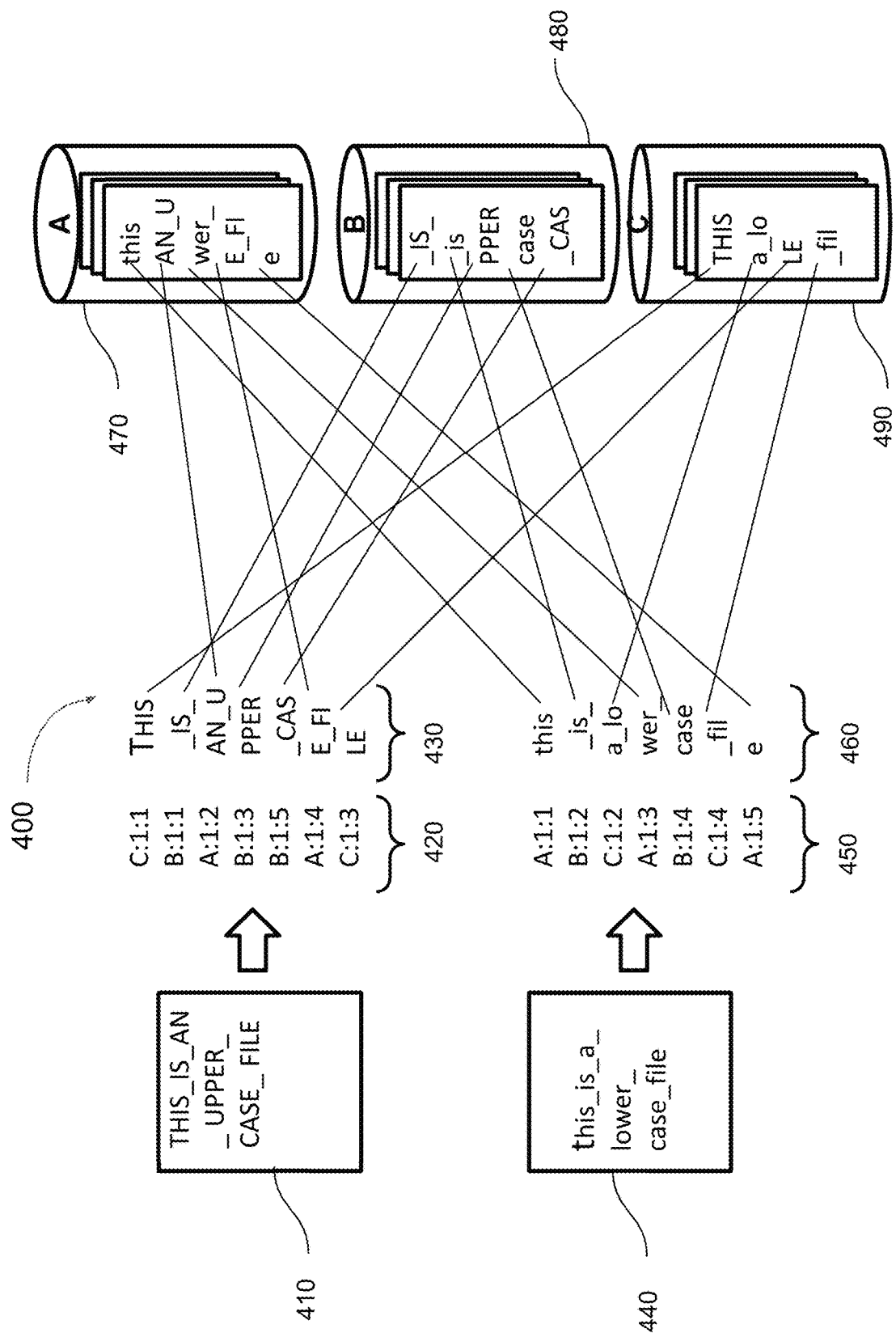
FIG. 4 is an exemplary diagram illustrating the mapping of microshard data fragments into storage resources, according to aspects of the present disclosure.

FIG. 4 is an exemplary diagram 400 illustrating the mapping of microshard data fragments into storage resources according to aspects of the present disclosure. The mapping in diagram 400 will be primarily described with respect to operations associated with system 100 described in FIG. 1. However, the mapping may easily be adapted to other arrangements of systems that generate and store microshard data fragments as part of their operations.

Source files 410 and 440 are received at computer 110. The source file 410 and 440 are broken into groups of four character (e.g., byte) microshard data fragments, illustrated in columns 430 and 460, by microshard data engine 115. The microshard data fragments are communicated via a network connection to storage manager 155. Storage manager 115 provides each of the microshard data fragments to a different storage element in one of storage array 130, network attached storage 140, cloud storage provided 170, and cloud storage provider 180, illustrated as storage device A 470, storage device B 480, and storage device C 490.

Storage manager 115 also generates a pointer entry, illustrated in columns 420 and 450, for each of the stored microshard data fragments in columns 430 and 450. The pointer entries define how the microshard data fragments are stored. As illustrated, each pointer entry includes a first value associated with the storage device used for storing the microshard data fragment (e.g., storage array 130, network attached storage 140, cloud storage provided 170, and cloud storage provider 180), a second value for the storage resource used for storing the microshard data fragment, and a third value for an incremental shared index defining the storage element of the storage resource in which the microshard data fragment is stored. In other embodiments, different types and arrangements of values may be used in the pointer entries. The pointer entries may be stored and maintained in a pointer repository in storage manager 115 or in some other device in system 100 (e.g., computer 110).

Diagram 400 includes mapping lines showing where in one of the storage devices, identified as storage device A 470, storage device B 480, and storage device C 490. As illustrated, each of the pointer entries in columns 420 and 450 has the associated microshard data fragment being stored in a first storage resource (top one as illustrated) as indicated by the second value being a "1". The first or top microshard data fragment in column 430, "THIS", is shown stored at storage device C 490 in the first storage element based on the third value in the pointer entry for that microshard data fragment being 1. The second microshard data fragment shown in column 430, "_IS_", is stored at storage device B 480 in the first storage element based on the third value in the pointer entry for that microshard data fragment also being 1. The mapping of remaining microshard data fragments in column 430 until the last or bottom microshard data fragment, "LE", is stored at storage device C 490 in the third storage element. The mapping continues with the mapping of the microshard data fragments in column 460 until the last or bottom microshard data fragment, "e", is stored at storage resource A 470 in the fifth storage element.

Although not shown, the microshard data fragments stored in the first storage resource in each of storage device A 470, storage device B 480, and storage device C 490 are duplicated or copied and stored in a second storage resource that is configured exactly like the first resource. Additionally, each of storage device A 470, storage device B 480, and storage device C 490, are each configured to include a third storage resource that is used in conjunction with the first and second storage resources as part of an automatic recovery mechanism for source file data when errors are detected in the storage resources used for storing the microshard data fragments that compose the source file. In particular, the automatic recovery mechanism is capable of recovering the microshard data fragments when a plurality of storage elements errors resulting in loss or corruption of data has occurred.

It is worth noting that the microshard data fragments may be further processed prior to storage in the first storage resource and second storage resource in each of storage device A 470, storage device B 480, and storage device C 490. In some embodiments, the microshard data fragments or the received source file may be encrypted using one or more known data encryption schemes. In some embodiments, the microshard data fragments may have additional bits added. The added bits are generated by applying one of the well-known parity checking or erasure coding algorithms to the microshard data fragment as well as other microshard data fragments simultaneously depending on the algorithm. The parity data doesn't contain any of the original microshard data fragment, but instead is a result calculated from the values in the original data. The added parity data can be used to reconstruct or rebuild a microshard data fragment that has been corrupted by using the parity data information in that microshard data fragment and/or parity data from other stored microshard data fragments depending on the algorithm used. Examples of parity checking or erasure coding algorithms include, but are limited to, exclusive or (XOR), Reed Solomon, Hamming, and Rebuild.

The automatic recovery system is governed by a set of storage management policies established to achieve the objective of recovering the microshard data fragments when a plurality of storage elements errors resulting in loss or corruption of data has occurred. In addition to the inclusion of first, second, and third storage resources, the policies include not using the second and third storage resources as primary storage resources except when operating in an error recovery mode. The policies also establish that the second storage resource is linked or referenced to or associated with the first storage resource, and the third storage resource is linked or referenced to or associated with the first storage resource and the second storage resource. As a result, the second storage resource and the third resource storage are identified as not available for use with any storage activities. Further, the policies require that any microshard data fragment that is stored in the first storage resource is also stored in the secondary storage resource. Depending on the capabilities of the memory components in the storage resources, the microshard data fragment may be stored to the first storage resource and second storage resource synchronously or asynchronously. If stored synchronously, the storing of the microshard data fragment is not considered complete until it is successfully stored in both storage resources. If stored asynchronously, the microshard data fragment may be stored in the first storage resource and retrieved or read out and written and stored in the second storage resource. Alternatively, the microshard data fragment may be stored in the first storage resource and retained in a memory buffer for later storing in the second storage resource. The policies may also establish that when a microshard data fragment is removed from or deleted from the first storage resource, it also deleted or removed from the second and/or third storage resource.

In some embodiments, the automatic recovery system may implement a visual user interface that allows interaction with the user as part of establishing and managing storage resources using the storage management policies described herein. The user interface may include displaying prompts for user inputs, receiving inputs from the user, and displaying warning messages associated with the storage management policies. For example, the user may be able to select which storage resources are used for storing the microshard data fragments as part of configuring the automatic recovery system. The storage resources, as well as individual storage elements in the storage resources, may be selected and/or deselected from a list or may be directly entered by the user. For example, the user may select different combinations of storage providers (e.g., cloud storage provider 170, cloud storage provider 180) at different geographic locations to obtain the level of resilience and/or redundancy required. The user may also be able to select and manage the specific storage rules applied to the secondary and/or recovery storage resources.

Additionally, the user interface may include displaying warnings about one or more of the selections made by the user as part of configuring the automatic recovery system. For example, the user interface may include a warning while selecting storage resources or elements that a secondary storage resource or element is at the same storage provider (e.g., cloud storage provider 170, cloud storage provider 180), or in the same geographic region zone, as the corresponding primary storage resource or element. Such a configuration may be acceptable for resiliency but may not be acceptable for redundancy. The display may include a prompt to choose whether or not to continue with the selection.

The approach for automatic recovery of errors occurring in storing data, such as microshard data fragments using storage configuration along with the storage management policies, described herein provides the capability to provide a flexible range of balance between resiliency and redundancy. The inclusion of extra storage resources specifically for an error occurring in the primary storage resource as well as the secondary storage resource provides added redundancy with only a small increase in resources over a nominal redundancy configuration using a redundant pair of resources. The added redundancy, along with the storage policies, allows the user the ability to increase the resiliency of the storage system. For instance, using regional and/or storage provider distribution of the secondary storage elements decreases the likelihood that all primary storage elements as well as all secondary storage elements have errors simultaneously. Further, in the case of errors occurring in all primary storage elements it is still possible to recover all of the stored microshard data fragments even if an error has occurred in one of the secondary storage elements. By including a managed distribution of primary, secondary and recovery storage elements as part of the configuration, a storage system that includes a high level of redundancy as well as a high level of resiliency can be constructed.

The policies also establish how the automatic recovery mechanism operates when certain errors are detected in one or more of the storage locations in the first storage resource, the second storage resource, and/or the third recovery resource. The operations when errors are detected are referred to as error recovery modes. For example, in a normal operating mode corruption of a single microshard data fragment in a storage resource may be corrected using parity checking information included in other associated microshard data fragments in the storage resource. Additionally, in a first error recovery mode, a failure of one storage location containing a microshard data fragment in the first storage resource can be handled by copying the microshard data fragment from the second storage resource to the third storage resource, as described in FIG. 1. Information regarding these and other error recovery modes will be described in further detail below.

Figure 5:
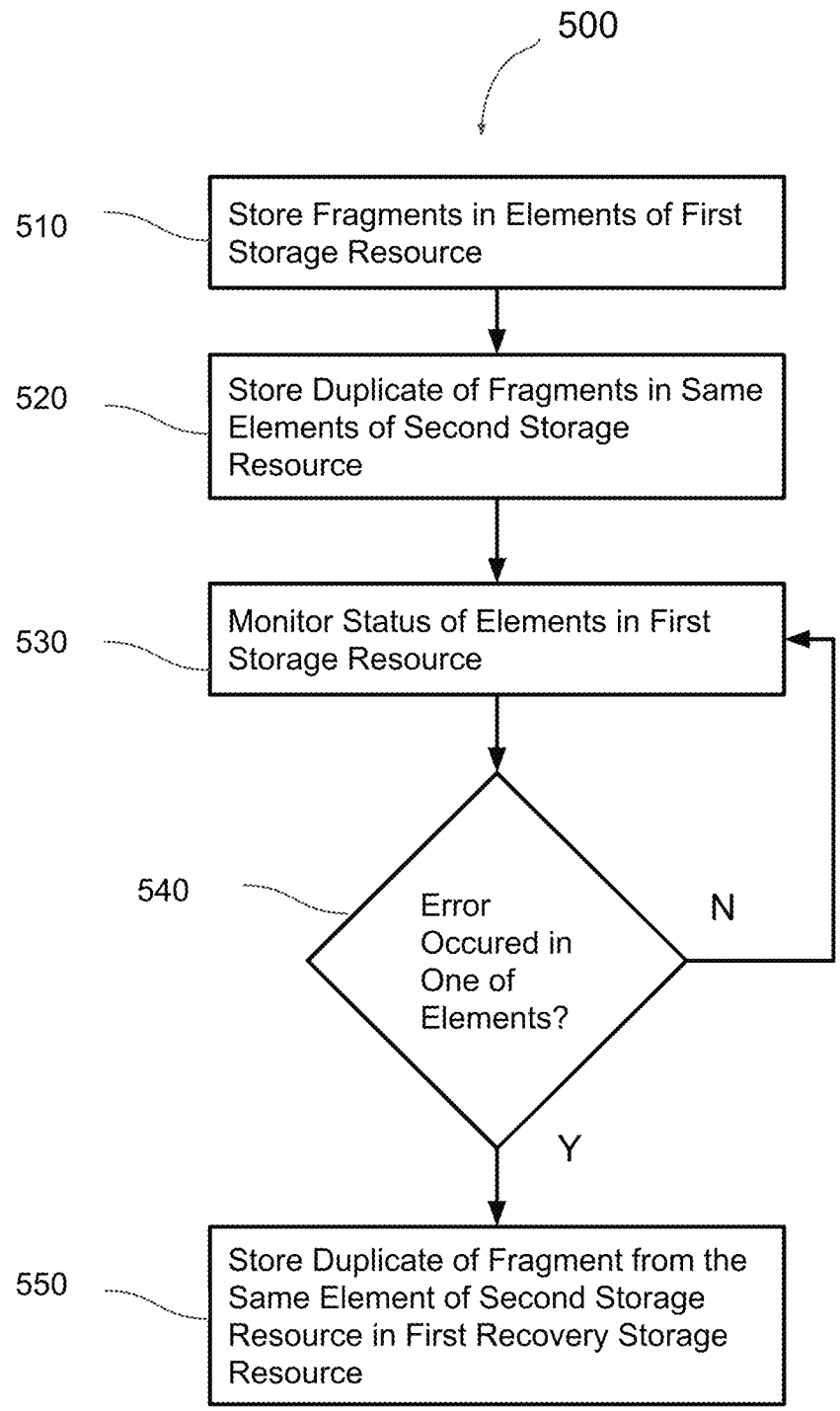
FIG. 5 is a flow chart of an exemplary process for error recovery of microshard data fragments in a storage structure, according to aspects of the present disclosure.

FIG. 5 illustrates a flow chart of an exemplary process 500 for error recovery of microshard data fragments in a storage structure according to aspects of the present disclosure. Process 500 will be primarily described with respect to system 100. One or more aspects of process 500 may be applied to other systems that make use of microshard data fragments and include the capability of managing storage resources. Although process 500 depicts steps performed in a particular order for purposes of illustration and discussion, the operations discussed herein are not limited to any particular order or arrangement.

At step 510, a microshard data fragment is stored in a first storage element of a first storage resource. The microshard data fragment is generated by a microshard data engine (e.g., microshard data engine 1150 for a source file as described earlier. The first storage resource may be a portion of a storage structure, such as storage array 130, network storage array 140, and cloud storage providers 170 and 180. The first storage resource may be configured by a storage resource manager (e.g., storage manager 155) to include a plurality of storage elements used for storing microshard data fragments. For example, the first storage resource may include six storage elements. In some embodiments, the first storage resource may be referred to as the primary storage resource. In some embodiments the microshard data fragment may include parity that is added prior to storage, as described above.

At step 520, a duplicate or copy of the microshard data fragment that was stored in the first storage element of the first storage resource, at step 510, is created and stored in a first storage element of a second storage resource. The duplicate may be created and stored by the storage structure and/or may be initiated based on instructions from the storage resource manager (e.g., storage manager 155) to duplicate the microshard data fragment. The second storage resource may be a different portion of the storage structure used for the first storage resource or may be a portion of a different storage structure. The second storage resource is configured to include the same number of storage elements as configured for the first storage resource (e.g., six storage elements). In some embodiments, the second storage resource may be referred to as the backup storage resource or the secondary storage resource. In some embodiment, the storage resource manager may configure the first storage resource and the second storage resource to be linked in a manner to assure proper redundant storage of the microshard data fragment.

At step 530, the status of the first storage element, as well as the other storage elements, of the first storage resource is monitored for proper operation. The monitoring may be performed by the storage structure containing the first storage resource or may be performed by the storage resource manager. At step 540, while monitoring status, at step 530, a determination is made as to whether an error has occurred in one of the storage elements, and in particular the first storage element, of the first storage resource. In some embodiments, the determination, step 540, may include determining if a storage element (e.g., the first storage element) has failed. A failure of a storage element typically indicates that the microshard data fragment will not be recoverable. In some embodiments, the determination, at step 540, may include determining if a storage element is corrupted. Corruption of the data in the microshard data fragment may be recoverable in some situations, such as when parity bits are included, as described above.

If, at step 540, the determination is made that no error has occurred in one of the storage elements (e.g., the first storage element), then process 500 returns to step 530 to continue monitoring status of the storage elements. If, at step 540, the determination is made that an error has occurred, then at step 550, a duplicate of the microshard data fragment that was stored, at step 520, in the corresponding storage element (e.g., the first storage element) of the second storage resource is created and stored in a storage element of the third storage resource. The duplicate may be created and stored by the storage structure and/or may be initiated based on instructions from the storage resource manager (e.g., storage manager 155) to duplicate the microshard data fragment. In some embodiments, the storage resource manager may further disable a failed storage element of the first storage resource and modify a resource pointer associated with the microshard data fragment, as described above, to point to the element in the third storage resource instead of the failed storage element of the first storage resource. In some embodiments, the third storage resource may be referred to as a recovery storage resource.

It is worth noting that one or more of the steps of process 500 may be modified, steps may be added or omitted depending on a specific embodiment. For example, the monitoring, at step 530 may include monitoring the status of the second storage resource and/or the third storage resource. Further, the determining step, at 540, may be modified to determine if an error has occurred in one of the storage elements of the second storage resource instead of the first storage resource. The duplication, at step 550, may be modified in a consistent manner to replace the storage element in the second storage element with the storage element in the third storage resource. In some embodiments, additional steps may be added for determining if errors have occurred in additional storage elements in any of the storage resources and the appropriate actions or modes taken for recovery from these error conditions. Information about one or more of these additional steps will be described in further detail below.

Figure 6:
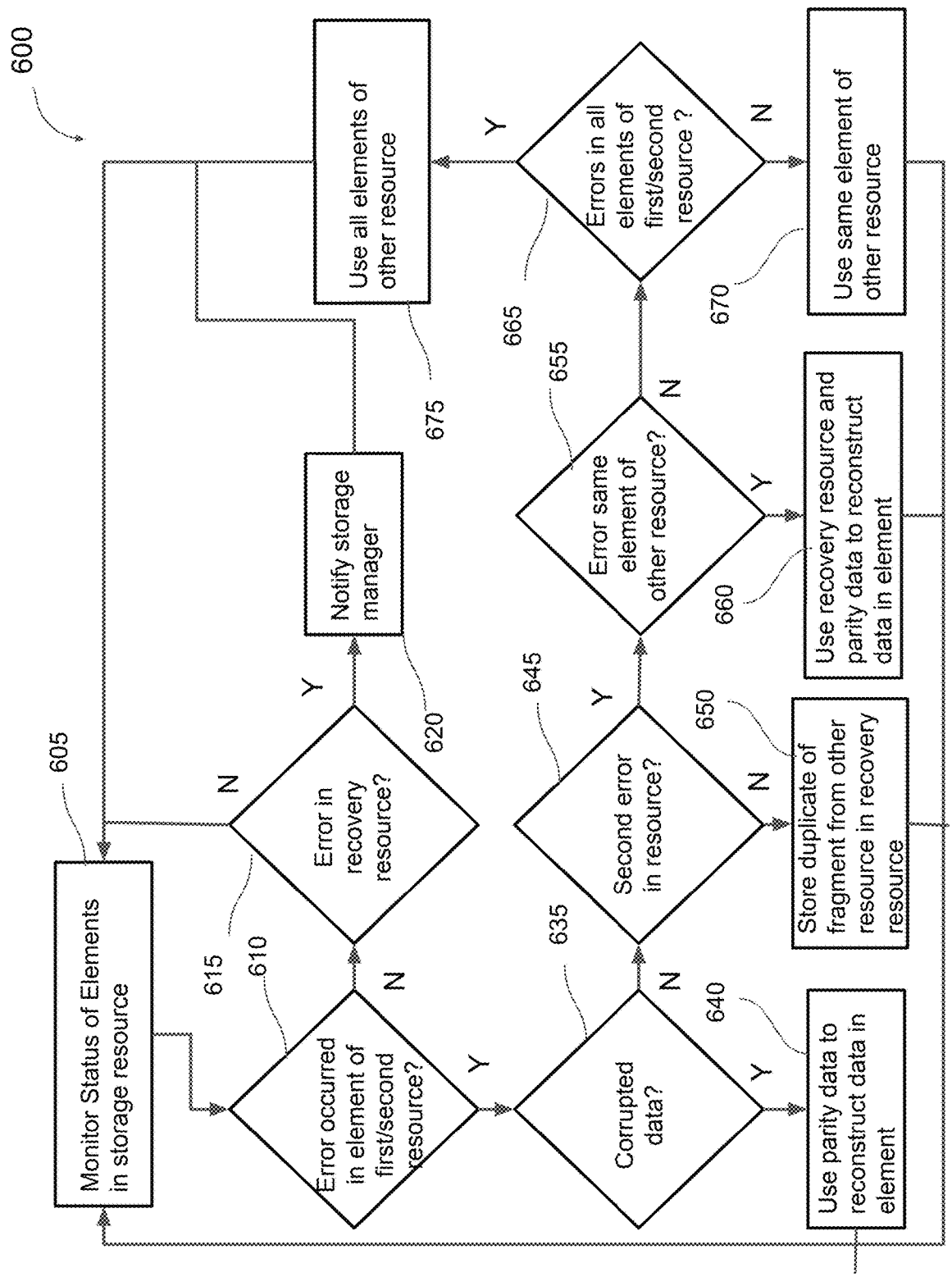
FIG. 6 is a flow chart of another exemplary process for error recovery of microshard data fragments in a storage structure, according to aspects of the present disclosure.

FIG. 6 illustrates a flow chart of another exemplary process 600 for error recovery of microshard data fragments in a storage structure according to aspects of the present disclosure. Process 600 will be primarily described with respect to system 100. One or more aspects of process 600 may be applied to other systems that make use of microshard data fragments and include the capability of managing storage resources. Further, one or more steps of process 600 may be included in, or replace, one or more of the steps in process 500 described in FIG. 5. Although process 600 depicts steps performed in a particular order for purposes of illustration and discussion, the operations discussed herein are not limited to any particular order or arrangement.

At step 605, the status of the storage elements of the first storage resource, the second storage resource, and the recovery storage resource are monitored for proper operation. The monitoring may be performed in a manner similar to that described at step 540 in process 500. At step 610, while monitoring status, at step 605, a determination is made as to whether an error has occurred in one of the storage elements of the first storage resource or the second storage resource. If, at step 610, the determination is made that no error has occurred in one of the storage elements of the first storage resource or the second storage resource, then, at step 615, a determination is made as to whether an error has occurred in one of the storage elements of the recovery storage resource.

If, at step 615, the determination is made that no error has occurred in one of the storage elements in the recovery storage resource, then process 600 returns to step 605 to continue monitoring status of the storage elements. If, at step 615, the determination is made that an error has occurred in one of the storage elements in the recovery storage resource, then a notification is sent to the storage resource manager (e.g, storage manager 155) that the storage element has failed and is not available. In some embodiments, the storage resource manager may further disable the failed storage element. Process 600 returns to step 605 to continue monitoring status of the storage elements.

If, at step 610, the determination is made that an error has occurred in one of the storage elements of the first storage resource or the second storage resource, then, at step 635, a determination is made as to whether the error in the storage element is due to corruption of data in the microshard data fragment stored in the storage element. If, at step 635, the determination is made that the error is due to corrupted data, then, at step 640, in one of the storage elements of the first storage resource or the second storage resource, then, at step 635, The corrupted microshard data fragment in the storage element is reconstructed using the parity data from the corrupted microshard data fragment and/or the microshard data fragments stored in other storage elements associated with the corrupted microshard data fragment, as described above. The reconstructed microshard data fragment is stored back in the storage element. Process 600 returns to step 605 to continue monitoring status of the storage elements.

If, at step 635, the determination is made that the error is not due to corrupted data, then, at step 645, a determination is made as to whether the error is the second or subsequent error in a storage element of either the first storage resource or the second storage resource. If, at step 645, the determination is made that the error is not the second or subsequent error in a storage element of either the first storage resource or the second storage resource, then at step 650, a duplicate of the microshard data fragment from the storage element in the storage resource that did not have the error is storage in the associated storage element from the recovery storage resource as described above. For example, if the error is in the first storage element of the first storage resource, then a duplicate of the microshard data fragment that was stored in the first storage element of the second storage resource is stored in an storage element of the recovery storage resource that is associated with the second storage resource, as described at step 550 in process 500. In some embodiments, the storage resource manager may further disable the failed storage element and/or modify a resource pointer to point to the storage element in the recovery storage resource. Process 600 returns to step 605 to continue monitoring status of the storage elements.

If, at step 645, the determination is made that the error is the second or subsequent error in a storage element of either the first storage resource or the second storage resource, then at step 655, a determination is made to whether the second or subsequent error is in the corresponding storage element of a storage element in the other storage resource that was previously determined to have an error. If, at step 655, the determination is made that the second or subsequent error is in the corresponding storage element of a storage element in the other storage resource that was previously determined to have an error, then, at step 660, depending on the recovery used for previous errors, a duplicate of the microshard data fragment from the storage element in the recovery storage resource used in place of the previously failed storage element from the first or second storage resource is stored in the storage element of the recovery storage resource associated with the storage resource that includes the storage element determined to have an error, at step 610. In some cases, the storage element in the recovery resource may not be available. In these cases, the microshard data fragment may be constructed using the parity data from microshard data fragments stored in other storage elements associated with the corrupted microshard data fragment, as described above. In some embodiments, the storage resource manager may further disable the failed storage element. Process 600 returns to step 605 to continue monitoring status of the storage elements.

If, at step 655 the determination is made the second or subsequent error is in the corresponding storage element of a storage element in the other storage resource that was previously determined to have an error, then, at step 665, a determination is made as to whether all of the storage elements of either the first storage resource or the second storage resource have been determined to have an error. If, at step 655, the determination is made that not all of the storage elements of either the first storage resource or the second storage resource have been determined to have an error, then at, step 670, depending on whether the error was in a storage element of the first storage resource or the second resource, the storage resource manager may provide instructions to use the corresponding storage element in the storage resource that was not determined to have an error, at step 610. For example, if the error determined, at step 655, is in a storage element of the first storage resource, the storage resource manager may direct storage of microshard data fragments directly to the corresponding storage element in the second storage resource. In some embodiments, the storage resource manager may further disable the failed storage element and/or modify a resource pointer to point to the storage element in the second storage resource. Process 600 returns to step 605 to continue monitoring status of the storage elements.

If, at step 655, the determination is made that all of the storage elements of either the first storage resource or the second storage resource have been determined to have an error, then at, step 675, depending on whether all of the storage element of the first storage resource or the second resource are determined to have errors, the storage resource manager may provide instructions to use all of the storage elements in the storage resource that does not have all storage elements determined to have errors. For example, if all of the storage elements of the first storage resource have been determined to have errors, the storage resource manager may direct storage of microshard data fragments directly to all of the storage elements in the second storage resource. In some embodiments, the storage resource manager may further disable the failed storage elements and/or modify a resource pointer to point to the storage elements in the second storage resource. Process 600 returns to step 605 to continue monitoring status of the storage elements.

FIGS. 7 through 13 illustrate a set of operational modes for a system including a storage structure according to various aspects of the present disclosure. The system operates in a manner similar to system 100 described in FIG. 1. The system includes a microshard engine similar to microshard engine 115. The system also includes a storage resource manager that operates in a manner similar to storage manager 155. The system further includes one or more storage structures similar to those described in system 100. In some embodiments, one storage structure may be used as in a network attached storage device (e.g., network attached storage 140). In some other embodiments the structures may be a plurality of storage structures coupled together directly as in a storage array (e.g., storage array 130). In still other embodiments a plurality of storage structures may be used and linked together via a network (e.g., cloud storage provider 170 and cloud storage provider 180. The one or more storage structures are configured to include a primary storage resource having six storage elements and a secondary storage resource also having six storage elements. In other embodiments, more or fewer than six storage elements may be used. The one or more structures are further configured to include a recovery storage resource having two storage elements, one associated with the primary storage resource and one associated with the secondary resource. The storage resource manager provides the microshard data fragments generated by the microshard engine to the storage elements in the primary storage resource, the secondary storage resource and/or the recovery storage resource depending on the operating conditions. The microshard data fragments have also been encoded with parity data, as described above, either in the microshard engine or storage resource manager prior to storage. Further, the storage resource manager controls the duplication of the stored microshard data fragments and the storing of the duplicate microshard data fragments in the storage elements in the primary storage resource, the secondary storage resource and/or the recovery storage resource. In each of FIGS. 7-13, like numbers refer to the same elements except for the first digit, which is indexed by FIG. number.

Figure 7:
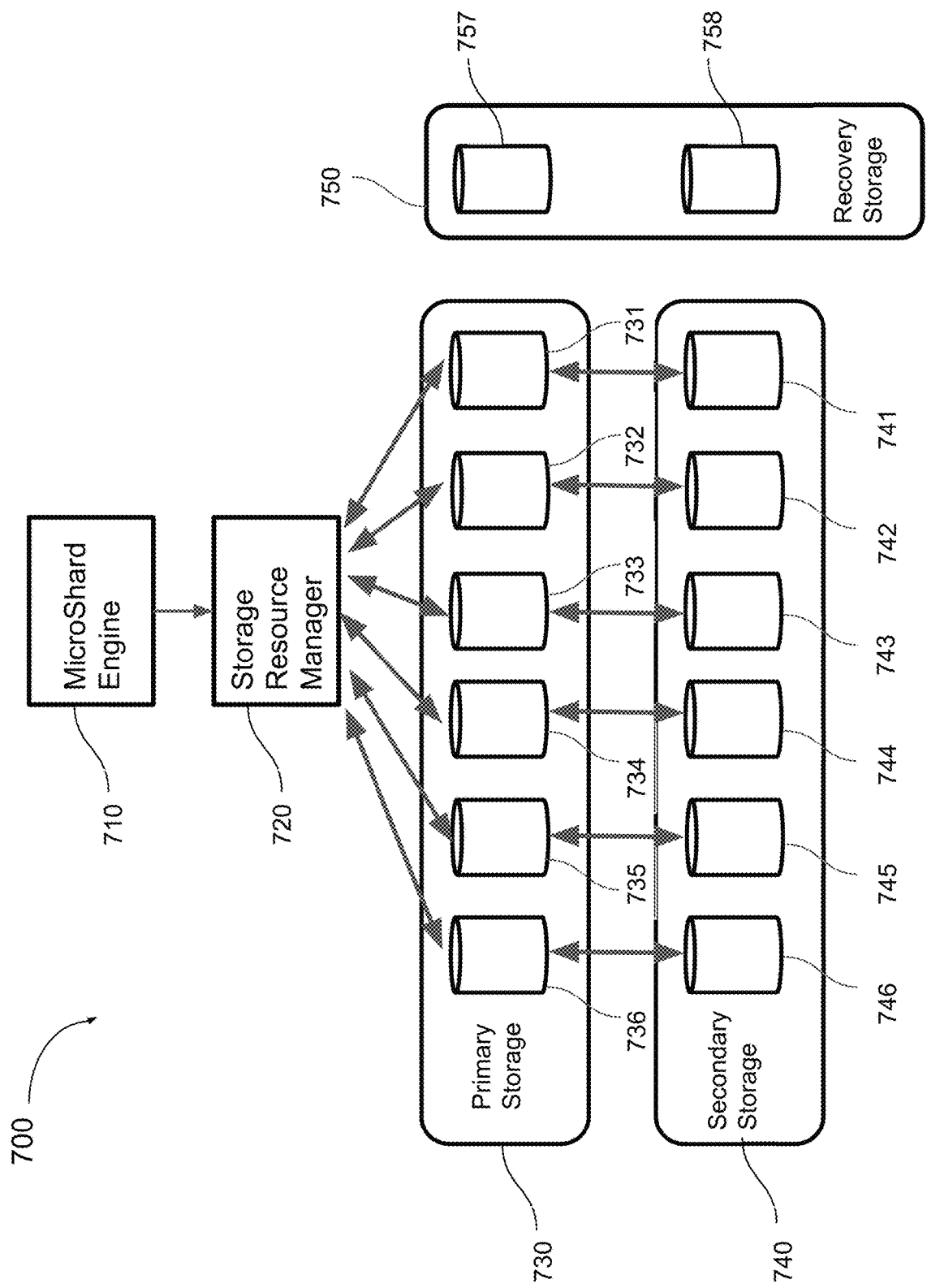
FIGS. 7 through 13 are a set of diagrams illustrating operational modes for a system including a storage structure, according to various aspects of the present disclosure.

FIG. 7 shows a system 700 operating a normal mode. In the normal operational mode, storage resource manager 720 stores and retrieves microshard data fragments generated from microshard engine 710 in storage elements 731-736 as part of primary storage resource 730. The storage resource manager 720 further provides instructions to duplicate the contents of each of the storage elements 731-736 and store the duplicate of the contents in the corresponding storage elements 741-746 as part of secondary storage resource 740. No microshard data fragments are stored in recovery storage resource 750.

As part of monitoring the operation of storage resource 730, if data corruption in one of the storage elements 731-736 is detected, the correction of the data in the corrupted storage element may be achieved by moving or transferring the duplicate contents for the corresponding storage element in secondary storage resource 740 to the corrupted storage element in the primary storage resource, overwriting the corrupted data. Alternatively, the corrupted microshard data fragment in the storage element is reconstructed using the parity data from the corrupted microshard data fragment and/or the microshard data fragments in other stored in other storage elements associated with the corrupted microshard data fragment, as described at step 635 in process 600.

Figure 8:
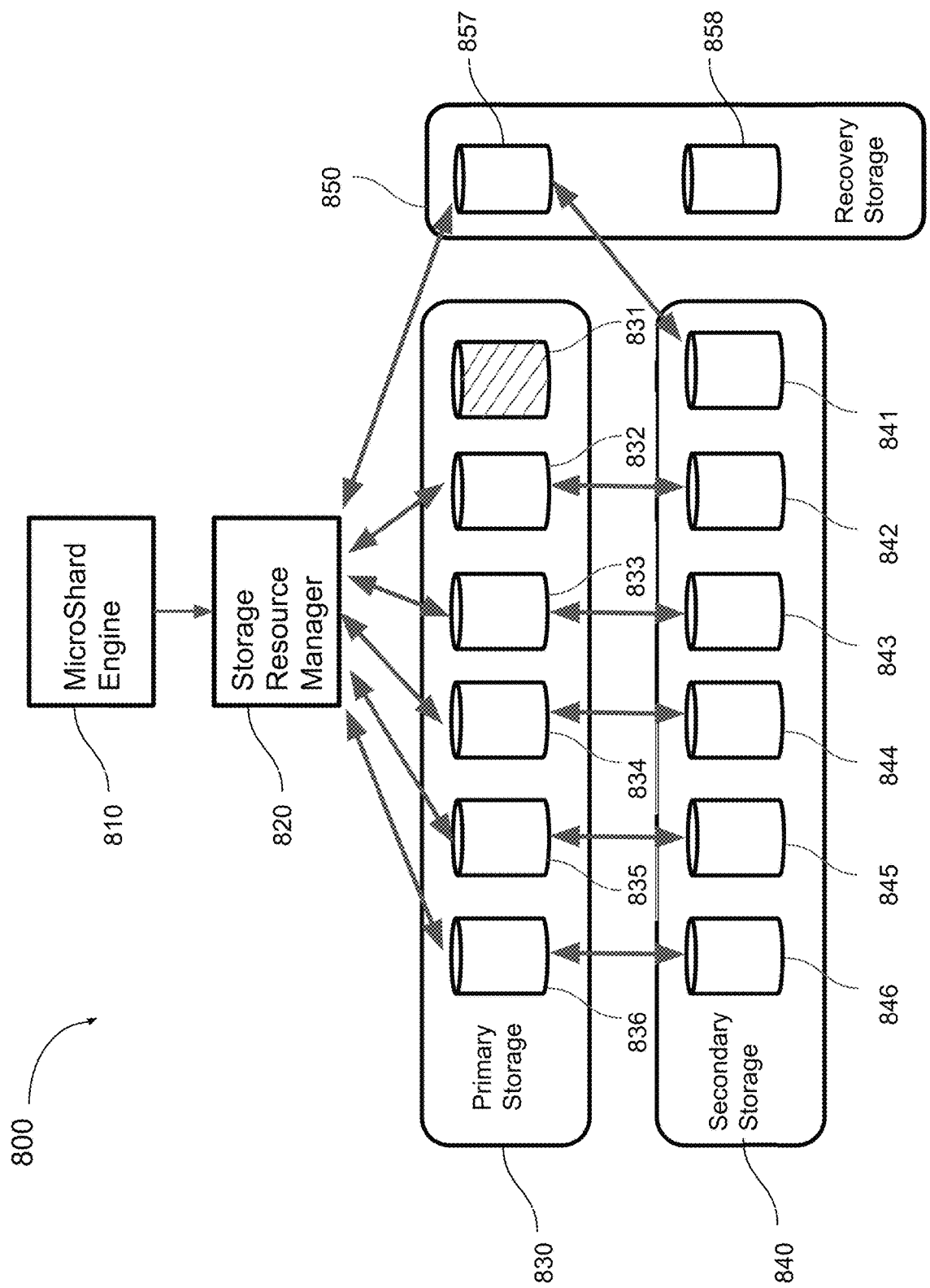

FIG. 8 shows a system 800 operating in a first error recovery mode. In the first error recovery mode, as part of monitoring the operation of storage resource 830, a failure of one of the storage elements 831-836 is detected. As illustrated, storage element 831 is shown as failed. The failure of the storage elements is more than just corruption of the data. The failure may include, but is not limited to, inability to write, read, or access the storage element, reading back all incorrect values for the data immediately following writing the data for storage, and the like. Once the failure is detected, storage resource manager 820 further provides instructions to duplicate the contents of the corresponding storage element in secondary storage resource 840 (e.g., storage element 841) and store the duplicate contents in recovery storage element 857 associated with primary storage resource 830 as part of recovery storage resource 850, similar to that described in step 540 in process 500. Storage resource manager 820 treats storage element 857 as a storage element in primary storage resource 830, maintaining an interface with six primary storage elements. Any new microshard data fragment stored in storage element 857 is also duplicated and stored in storage element 841 in a manner similar to that described in normal operating mode. In some embodiments, storage resource manager 820 may provide instructions to disable storage element 831, preventing further activity with that storage element. In some embodiments, a resource pointer for the stored microshard data fragment may be modified to point to storage element 857 instead of storage element 831.

Figure 9:
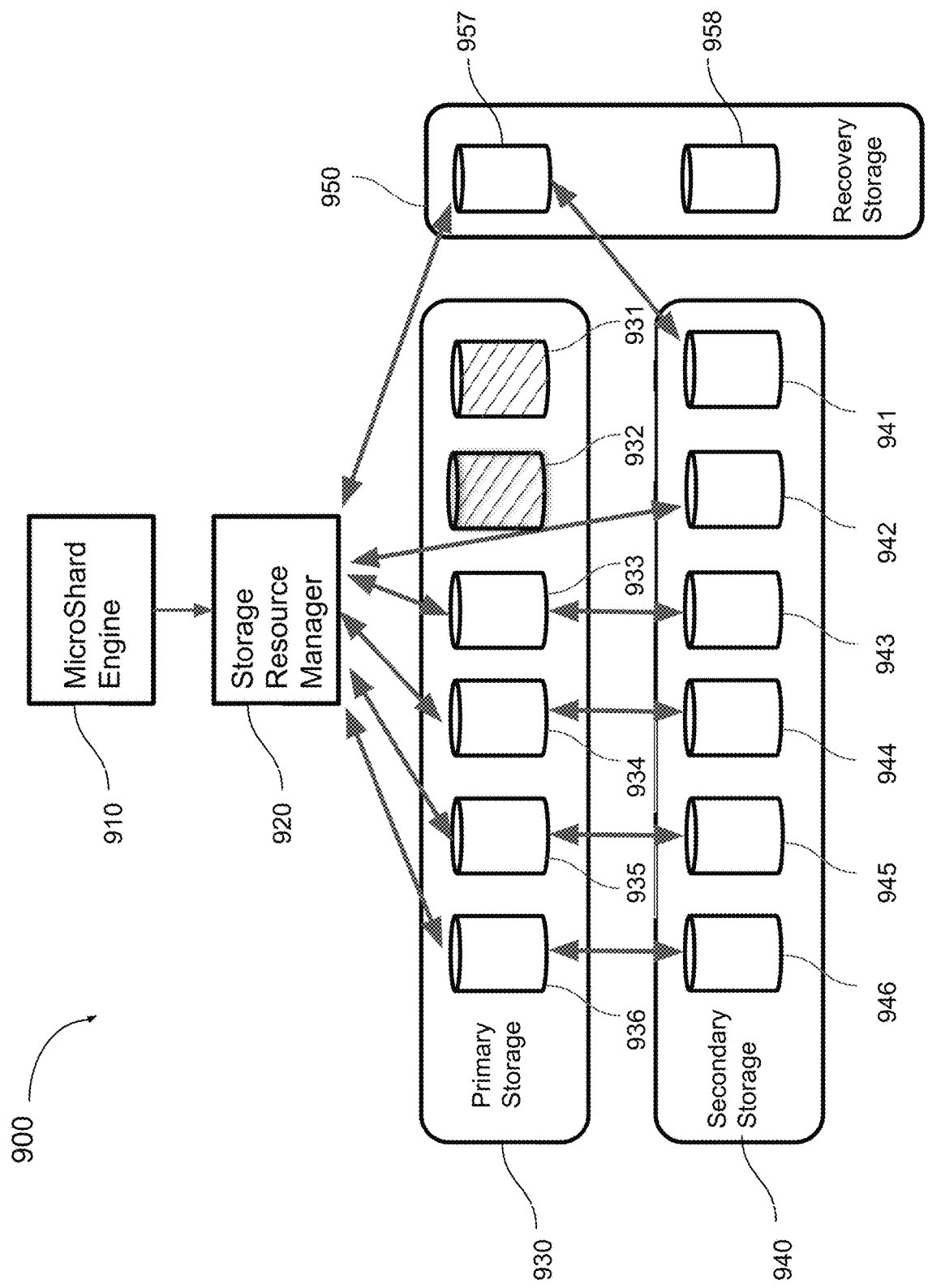

FIG. 9 shows a system 900 operating in a second error recovery mode. In the second error recovery mode, as part of monitoring the operation of primary storage resource 930, a failure of two of the storage elements 931-936 is detected. The failure may have occurred simultaneously or sequentially. As illustrated, both storage elements 931 and 932 are shown as failed. Once the failure is detected, storage resource manager 920 further provides instructions to address the failure of storage element 931 as described in FIG. 8, unless already addressed. The failure of storage element 932 cannot be addressed in a similar manner by using the second storage element in the recovery storage resource 950 (e.g., storage element 958) because the configuration of the memory system only provides for using one recovery storage element for each of the primary storage resource 730 and secondary storage resource 740. Storage manager 920 directly accesses storage element 942 for storing and receiving microshard data fragments. System 900 uses storage element 942 in secondary storage resource 940 in place of the failed storage element 932 in primary storage resource 930. As a result, system 900 is still able to maintain six working "primary" storage elements, four working storage elements in primary storage resource 930, one secondary storage resource 957 and one storage element from secondary storage resource 940. In some embodiments, storage resource manager 920 may provide instructions to disable storage element 932, preventing further activity with that storage element. In some embodiments, a resource pointer for the stored microshard data fragments may be modified to point to storage element 942 instead of storage element 932. The configuration described in system 900 may also be used for additional failed storage elements in primary storage resource 930.

Figure 10:
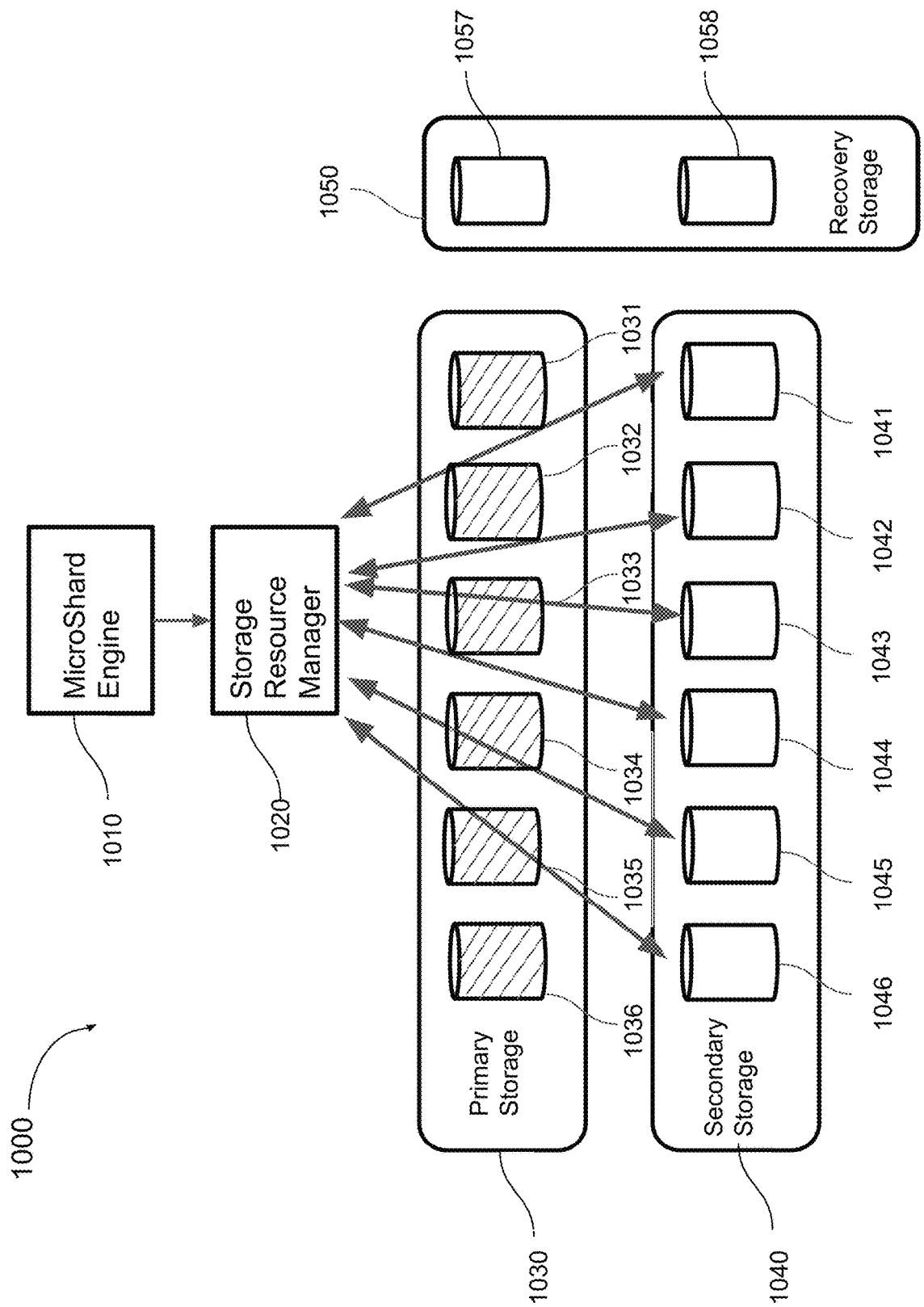

FIG. 10 shows a system 1000 operating in a third error recovery mode. In the third error recovery mode, as part of monitoring the operation of all six storage elements in primary storage resource 1030, a failure of all the storage elements 931-936 is detected. The failures may have occurred simultaneously or sequentially. A failure of all storage elements in use in a storage resource is deemed as a failure of the storage resource completely. In order to minimize potential future issues, system 1000 shows using all six of the corresponding storage elements 1041-1046 in secondary storage resource 1040 as the primary storage resource. Storage manager 1020 directly accesses storage elements 1041-1046 for storing and receiving microshard data fragments. In some embodiments, storage resource manager 1020 may provide instructions to disable storage elements 1031-1036 or the entire storage resource 1030, preventing further activity with those storage elements or that storage resource. In some embodiments, a resource pointer for the stored microshard data fragments may be modified to point to storage elements 1041-1046 instead of storage element 1031-1036.

Figure 11:
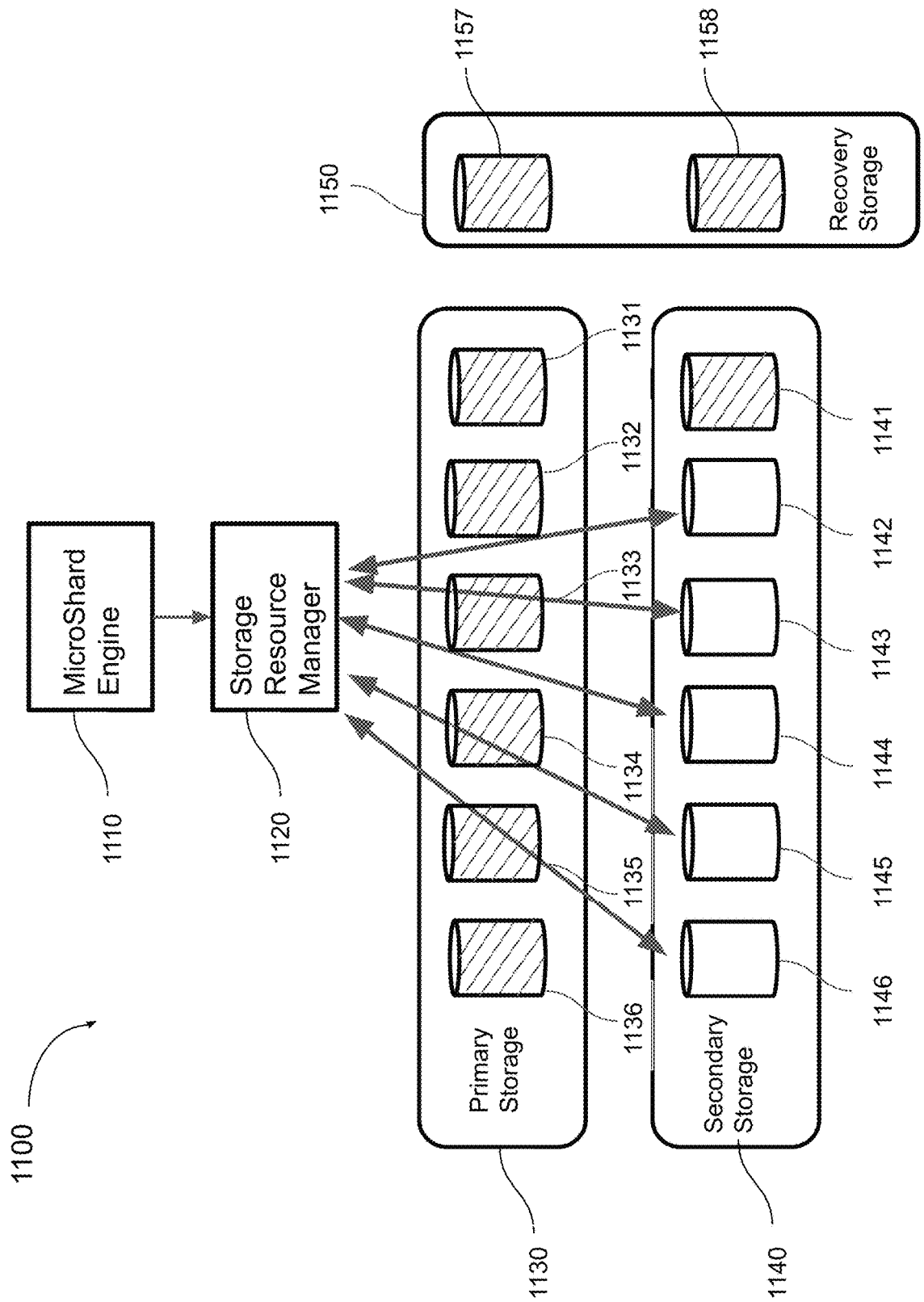

FIG. 11 shows a system 1100 operating in a fourth error recovery mode. In the fourth error recovery mode, as part of monitoring the operation of all six storage elements in primary storage resource 1130, a failure of all the storage elements 931-936 is detected. In addition, while monitoring the operation of all six elements in secondary storage resource 1140, a failure of one storage element, shown as storage element 1141, is detected. Further, while monitoring the operation of the recovery storage resource 1150, a failure of both storage elements 1157 and 1158. The failures may have occurred simultaneously or sequentially. Storage manager 1100 directly accesses storage elements 1142-1146 in secondary storage resource 1140 in a manner similar to that described above. The microshard data fragment from storage element 1141 is reconstructed using the parity data from the microshard data fragments in storage elements 1142-1146 as described above. In some embodiments, storage resource manager 1120 may provide instructions to disable storage elements 1031-1036 or the entire storage resource 1030, along with the recovery storage resource 1150 and storage element 1141 in secondary storage resource 1140, preventing further activity with those storage elements or that storage resource. In some embodiments, a resource pointer for the stored microshard data fragments may be modified to point to storage elements 1142-1146 instead of storage element 1132-1136.

Figure 12:
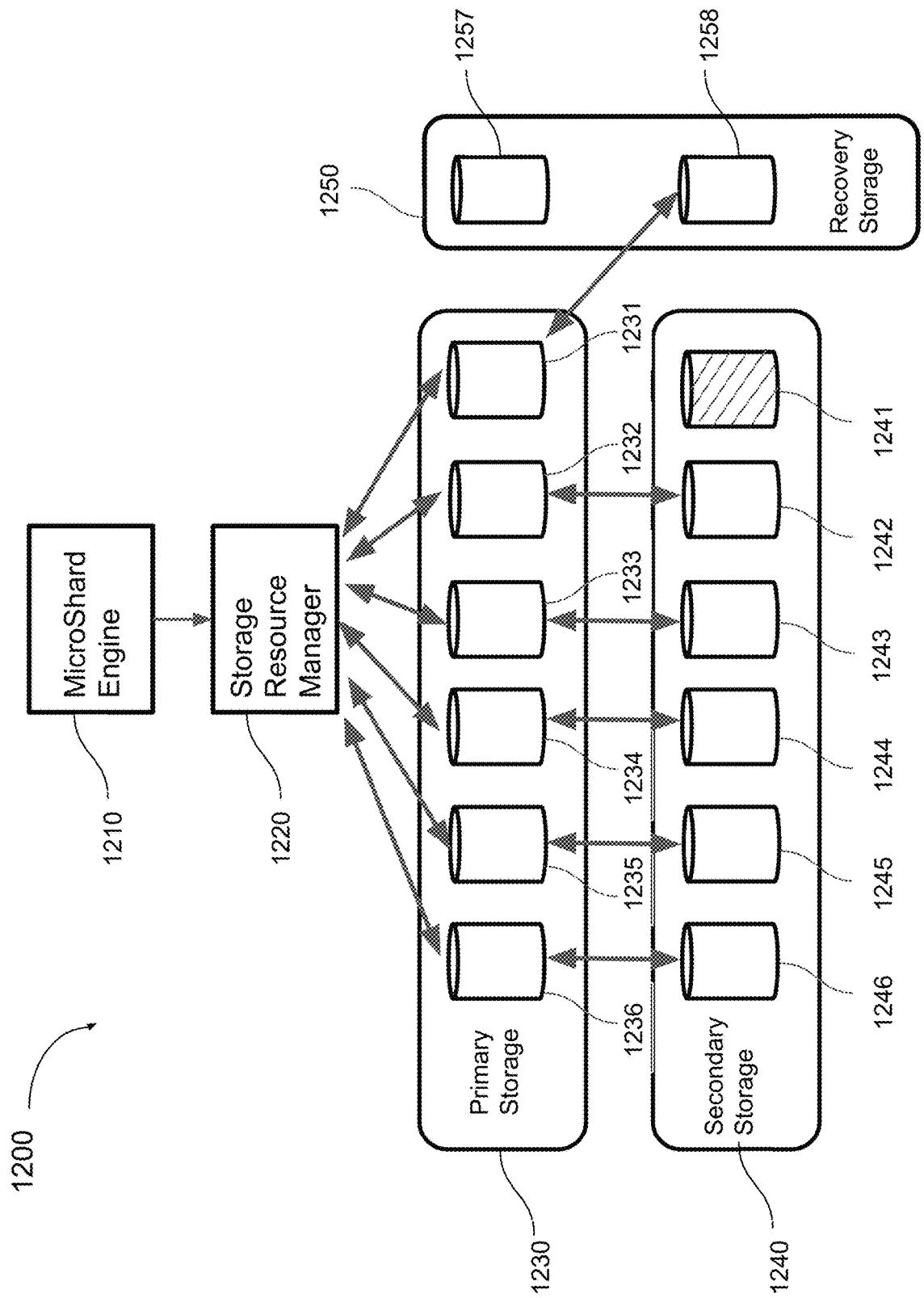

FIG. 12 shows a system 1200 operating in a fifth error recovery mode. In the fifth error recovery mode, as part of monitoring the operation of secondary storage resource 1240, a failure of one of the storage elements 1241-1246 is detected. As illustrated, storage element 1241 is shown as failed. Once the failure is detected, storage resource manager 1220 further provides instructions to duplicate the contents of the corresponding storage element in primary storage resource 1230 (e.g., storage element 1231) and store the duplicate contents in recovery storage element 1258 associated with secondary storage resource 1250 in a manner similar to that described above. Storage resource manager 1220 treats storage element 1258 as a storage element in secondary storage resource 1240, sending instructions to synchronize storage element 1287 with the contents of storage element 1231 in a manner similar to that described for normal operation mode. In some embodiments, storage resource manager 1220 may provide instructions to disable storage element 1241, preventing further activity with that storage element.

Figure 13:
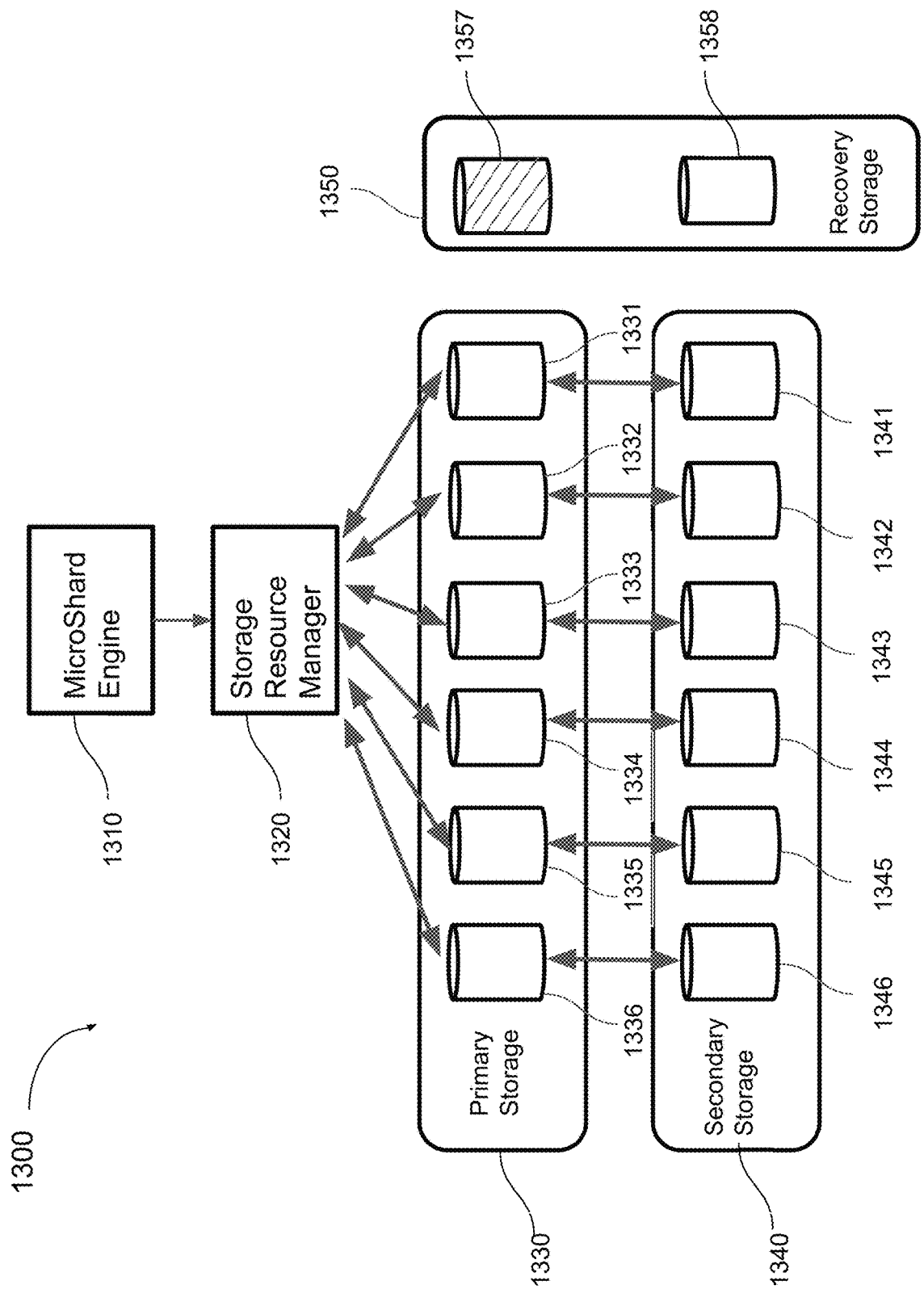

FIG. 13 shows a system 1300 operating in a sixth error recovery mode. In the sixth error recovery mode, as part of monitoring the operation of recovery storage resource 1350, a failure of one of the storage elements 1357-1358 is detected. As illustrated, storage element 1357 is shown as failed. Once the failure is detected, a notification is sent to storage resource manager 1320 that storage element 1357 has failed and is not available, in a manner similar to that described at step 620 in process 600. Storage resource manager 1320 adjusts its response to future storage errors, such as described above, to take into account the unavailability of the failed storage element. The notification and operational changes described in system 1300 may also be used for additional failed storage elements in recovery storage resource 1350.

Figure 14:
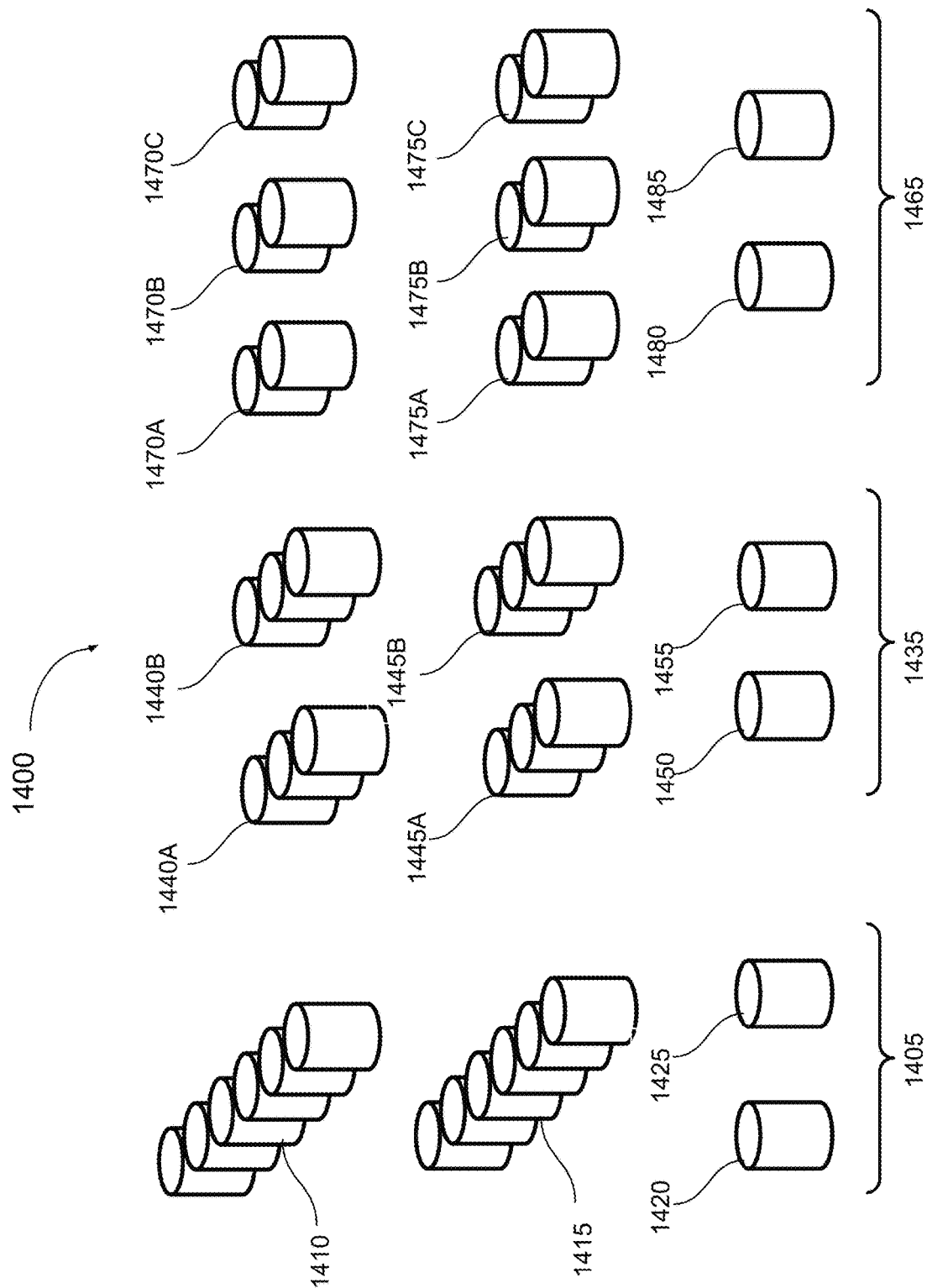
FIG. 14 is a block diagram of an exemplary storage system according to aspects of the present disclosure.

FIG. 14 shows a block diagram of exemplary storage system 1400 according to aspects of the present disclosure. The storage structures in storage system 1400 may use storage devices similar to those described above (e.g., storage array 130, network attached storage 140, cloud storage providers 170, 180 described in FIG. 1). Each storage structure may be the same or different. Additionally, each storage structure may be configured or arranged in a different manner with respect to storage resources for storing microshard data fragments. Further, each storage structure may be at different geographic locations.

As illustrated in FIG. 14, storage system 1400 includes three storage structures, storage structure 1405, storage structure 1435, and storage structure 1465. Storage structure 1405 includes a primary storage resource 1410 and a secondary storage resource 1415, each having six storage elements. Storage structure 1405 further includes storage elements 1420 and 1425 used as the recovery storage resource. Storage structure 1435 includes a primary storage resource 1440 and a secondary storage resource 1445, each having six storage elements. Storage structure 1435 further includes storage elements 1450 and 1455 used as the recovery storage resource. Storage structure 1465 includes a primary storage resource 1470 and a secondary storage resource 1475, each having six storage elements. Storage structure 1475 further includes storage elements 1480 and 1485 used as the recovery storage resource. In other embodiments, each of the storage structures may use more or fewer than six storage elements in the primary and secondary storage resources. It is worth noting that the same number of recovery storage elements is maintained regardless of Each of the storage structures 1405, 1435, and 1465 show a different configuration or arrangement of the storage elements used for primary storage resources 1410, 1440, and 1470 respectively. Each of secondary storage resources 1415, 1445, and 1470 use the same configuration or arrangement of storage elements as their corresponding primary storage resources. The plurality of configurations or arrangements storage elements allows additional flexibility for the efficient utilization of memory resources in various types of storage structures. Further, choosing an arrangement that has its largest value of storage elements easily divisible by smaller values (e.g., the value of 6 is divisible by 2 and 3) increases the flexibility for the utilization of memory resources. It is worth noting that the same number of recovery storage elements is maintained regardless of the number of, or arrangement of the storage elements in the primary and secondary storage resources. As a result, the full complement of storage resources needed to operate an automatic recovery system for data, such as microshard data fragments, as described in the present embodiments, may easily be utilized over varying geographic locations.

As shown in FIG. 14, Each of the storage structures 1405, 1435, and 1465 are configured to include a primary storage resource (e.g., primary storage resource 1410), a corresponding secondary storage resource (e.g., secondary storage resource 1415), and corresponding recovery storage resources (e.g., recovery storage resource 1420, 1425). In other embodiments, one or more of the storage resources may be further distributed to other storage structures. For example, secondary storage resource 1415 may be included on storage structure 1465 and recovery storage resources 1480 and 1485 may be included on storage structure 1405. The placement and/or distribution of associated storage resources across multiple storage structures may provide additional protection against unauthorized access to the microshard data fragments and may also provide some additional resiliency against errors in the storage resources.

Further, in some embodiments, more than one recovery storage resource may be associated with a corresponding primary and/or secondary storage. For example, each of primary storage resource 1410 and secondary storage resource 1415 may have two recovery storage resources each instead of one each as shown in FIG. 14 (e.g., recovery storage resource 1420 and recovery storage resource 1425).

The additional recovery storage resources may help provide the necessary resiliency due to higher than expected errors that occur in the storage structure. However, the number of recovery storage resources should always be less than the number of storage elements in the primary and/or secondary storage resource in order to maintain an efficient balance between resiliency and storage redundancy.

It is to be appreciated that although the embodiments described above focus on physical hardware and components within a signal communication system, the principles of the present disclosure may be easily extended to implementations that involve software based programming instructions that are stored in a computer readable medium, such as a magnetic or optical based storage structure. Further, in some embodiments, one or more of the steps of a process based on the principles of the present disclosure, such as process 500 or process 600 described above may be implemented utilizing cloud-based operations and/or storage. It is to be appreciated that, except where explicitly indicated in the description above, the various features included as part of the principles of the present disclosure can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for a method for automatic recovery using microshard data fragmentation, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method for automatic recovery of a portion of source data that is broken into a plurality of microshard data fragments, the method comprising:
storing one of the plurality of microshard data fragments in a first storage element of a first storage resource, the first storage resource having a plurality of storage elements;
creating and storing a duplicate of the one of the plurality of microshard data fragments in a first storage element of a second storage resource, the second storage resource having at least the same number of storage elements as the first storage resource;
determining whether an error has occurred in the first storage element of the first storage resource;
creating and storing a duplicate of the microshard data fragment stored in the first storage element of the second storage resource in a first recovery storage resource based on the determination;
wherein the duplicate microshard data fragment stored in the first recovery storage resource is used to recover the portion of the source data.

2. The method of claim 1, further comprising disabling the first storage element of the first storage resource and modifying a resource pointer associated with the one of the plurality of microshard data fragments to point to the first recovery storage resource instead of the first storage element of the first storage resource.

3. The method of claim 1, further comprising:
determining whether an error has occurred in the first storage element of the second storage resource;
creating and storing a duplicate of the one of the plurality of microshard data fragments stored in the first storage element of the first storage resource to a second recovery storage resource based on the determination of whether an error has occurred in the first storage element of the second storage resource; and
disabling the first storage element of the second storage resource.

4. The method of claim 1, further comprising:
storing a second one of the plurality of microshard data fragments in a second storage element of the first storage resource;
creating and storing a duplicate of the second one of the plurality of microshard data fragments in a second storage element of the second storage resource;
determining if an error has occurred in the second storage element of the first storage resource; and
modifying a resource pointer associated with the second one of the plurality of microshard data fragments to point to the second storage element of the second storage resource instead of the second storage element of the first storage resource further based on the determination whether an error has occurred in the second storage element of the first storage resource.

5. The method of claim 1, further comprising:
storing a second one of the plurality of microshard data fragments in a second storage element of the first storage resource;
creating and storing a duplicate of the second microshard data fragment in a second storage element of the second storage resource;
determining whether the second microshard data fragment in the second storage element of the first storage resource is corrupted; and
applying an erasure coding process to correct the corruption using at least one of the microshard data fragment in the first storage element of the first storage resource, the second microshard data fragment in the second storage element of the second storage resource, and the microshard data fragment in the first recovery resource if it is determined that the second storage element of the first storage resource is corrupted.

6. The method of claim 4, wherein the plurality of storage elements in the first storage resource and the second storage resource is at least three storage elements, and the method further comprising:
storing a third one of the plurality of microshard data fragments in a third storage element of the first storage resource;
creating and storing a duplicate of the third one of the plurality of microshard data fragments in a third storage element of the second storage resource;
determining if an error has occurred in at least two of the storage elements of the first storage resource;
determining if an error has occurred in one of the at least two of the storage elements of the second storage resource; and
applying an erasure coding process to correct the error in the one of the at least two storage elements of the second storage resource based on the determining whether an error has occurred in at least two of the storage elements of the first storage resource and determining if an error has occurred in one of the at least two of the storage elements of the second storage resource, the erasure coding process being applied to at least one storage element in at least one of the first storage resource, the second storage resource, and the first recovery resource.

7. The method of claim 1, wherein the first storage resource is a primary storage resource and the second storage resource is a secondary storage resource.

8. The method of claim 1, wherein the first recovery storage resource has less than the number of storage elements in both of the first storage resource and second storage resource.

9. The method of claim 1, wherein each one of the plurality of microshard data fragments has a maximum size that is less than the size of a data field in the source file.

10. The method of claim 1, wherein determining whether an error has occurred in the first storage element of the first storage resource includes determining if the first storage element has failed.

11. A system for automatic recovery of a portion of source data that is broken into a plurality of microshard data fragments, comprising:
a microshard data fragment engine generating a plurality of microshard data fragments from the portion of the source data;
a first storage resource containing a plurality storage elements;
a second storage resource containing same number of storage elements as the first storage resource;
a storage resource manager, coupled to the microshard data fragment engine, the first storage resource and the second storage resource, the storage resource manager storing one of the plurality of microshard data fragments in a first storage element of the first storage resource and creating and storing a duplicate of the one of the plurality of microshard data fragments in a first storage element of the second storage resource, the storage resource manager further determining whether an error has occurred in the first storage element of the first storage resource; and
a first recovery storage resource coupled to the storage resource manager; wherein the storage resource manager further creates and stores a duplicate of the microshard data fragment stored in the first storage element of the second storage resource in a first recovery storage resource based on the determination; and
wherein the duplicate of the microshard data fragment stored in the first recovery storage resource is used to recover the portion of the source data.

12. The system of claim 11, wherein the storage resource manager further disables the first storage element of the first storage resource and modify a resource pointer associated with the one of the plurality of microshard data fragments to point to the first recovery storage resource instead of the first storage element of the first storage resource.

13. The system of claim 11, wherein the storage resource manager further determines whether an error has occurred in the first storage element of the second storage resource, creates and stores a duplicate of the one of the plurality of microshard data fragments stored in the first storage element of the first storage resource to a second recovery storage resource based on the determination, and disables the first storage element of the second storage resource.

14. The system of claim 11, wherein the storage resource manager further stores a second one of the plurality of microshard data fragments in a second storage element of the first storage resource, creates and stores a duplicate of the second one of the plurality of microshard data fragments in a second storage element of the second storage resource, determines if an error has occurred in the second storage element of the first storage resource, and modifies a resource pointer associated with the second one of the plurality of microshard data fragments to point to the second storage element of the second storage resource instead of the second storage element of the first storage resource further based on the determination whether an error has occurred in the second storage element of the first storage resource.

15. The system of claim 11, wherein the storage resource manager further stores a second one of the plurality of microshard data fragments in a second storage element of the first storage resource, creates and stores a duplicate of the second microshard data fragment in a second storage element of the second storage resource, determines whether the second microshard data fragment in the second storage element of the first storage resource is corrupted, and applies an erasure coding process to correct the corruption using at least one of the microshard data fragment in the first storage element of the first storage resource, the second microshard data fragment in the second storage element of the second storage resource, and the microshard data fragment in the first recovery resource if it is determined that the second storage element of the first storage resource is corrupted.

16. The system of claim 14, wherein the plurality of storage elements in the first storage resource and the second storage resource is at least three storage elements and wherein the storage resource manager further stores a third one of the plurality of microshard data fragments in a third storage element of the first storage resource, creates and stores the third one of the plurality of microshard data fragments in a third storage element of the second storage resource, determines if an error has occurred in at least two of the storage elements of the first storage resource, determines if an error has occurred in one of the at least two of the storage elements of the second storage resource, and applies an erasure coding process to correct the error in the one of the at least two storage elements of the second storage resource based on the determining whether an error has occurred in at least two of the storage elements of the first storage resource and determining if an error has occurred in one of the at least two of the storage elements of the second storage resource, the erasure coding process being applied to at least one storage element in at least one of the first storage resource, the second storage resource, and the first recovery resource.

17. The system of claim 11, wherein the first storage resource is a primary storage resource and the second storage resource is a secondary storage resource.

18. The system of claim 11, wherein the first recovery storage resource has less than the number of storage elements in both of the first storage resource and second storage resource.

19. The system of claim 11, wherein each one of the plurality of microshard data fragments has a maximum size that is less than the size of a data field in the source file.

20. The system of claim 11, wherein determining whether an error has occurred in the first storage element of the first storage resource includes determining if the first storage element has failed.

* * * * *